United States Patent
Makke et al.

(10) Patent No.: US 10,247,233 B1
(45) Date of Patent: Apr. 2, 2019

(54) TANDEM BALL BEARING WITH LABYRINTH OIL PATH AND METHOD THEREOF

(71) Applicant: Schaeffler Technologies AG & Co. KG, Herzogenaurach (DE)

(72) Inventors: Alaa Makke, Farmington Hills, MI (US); Kyle Hassay, Windsor (CA); Timothy Jacques, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/708,261

(22) Filed: Sep. 19, 2017

(51) Int. Cl.
*F16C 33/66* (2006.01)
*F16C 19/18* (2006.01)

(52) U.S. Cl.
CPC ........ *F16C 19/182* (2013.01); *F16C 33/6681* (2013.01)

(58) Field of Classification Search
CPC ................ F16C 19/182; F16C 33/3806; F16C 33/6681; F16C 33/80
See application file for complete search history.

(56) References Cited

U.S. PATENT DOCUMENTS

| | | |
|---|---|---|
| 7,175,351 B2 | 2/2007 | Ono et al. |
| 7,320,550 B2 | 1/2008 | Ono et al. |
| 2007/0242913 A1 | 10/2007 | Kawaguchi |
| 2011/0142388 A1 | 6/2011 | Maejima et al. |
| 2012/0237151 A1 | 9/2012 | Felis |
| 2015/0104126 A1* | 4/2015 | Chudo ................ F16C 33/4605 384/578 |
| 2015/0176650 A1* | 6/2015 | Suzuki ................ F16C 33/6681 384/470 |

FOREIGN PATENT DOCUMENTS

JP 2013019504 A * 1/2013 ............ F16C 33/767

\* cited by examiner

*Primary Examiner* — Phillip A Johnson

(57) ABSTRACT

A tandem ball bearing, including: an axis of rotation; outer and inner races; a cage radially disposed between the inner and outer races and including a surface, the surface facing at least partially in a first axial direction and bounding a portion of the cage extending furthest in the first axial direction; a first roller ball disposed in the cage and radially disposed between the inner and outer races; a second roller ball disposed in the cage radially outwardly of the first roller ball; and a channel bounded by the inner race and the cage and including an opening facing in the first axial direction and bounded by the inner race and the first surface of the cage. A first line, in a second axial direction, opposite the first axial direction, passes through in sequence: the cage; the channel; the inner race; and the first roller ball.

20 Claims, 5 Drawing Sheets

TANDEM BALL BEARING WITH LABYRINTH OIL PATH AND METHOD THEREOF

TECHNICAL FIELD

The present disclosure relates to a tandem ball bearing with a labyrinth oil path and a method of using a tandem ball bearing with a labyrinth oil path.

BACKGROUND

FIG. 5 is a partial cross-sectional view of a prior art tandem bearing 200. Bearing 200 includes: inner race 202; outer race 204 located radially outwardly of outer race 202; cage 206; roller ball 208; roller ball 210; and channel 212. Balls 208 and 210 are disposed in cage 206 and are radially disposed between races 202 and 204. Channel 212 is bounded by inner race 202 and cage 206. Lubricating fluid is needed to reduce friction between balls 208 and 210 and races 202 and 204 during operation of bearing 200. The path for lubricating fluid to reach balls 208 and 210 is through channel 212 and opening 214.

Excessive lubricating fluid in bearing 200 can result in churning, or lubrication friction, losses, which reduces the efficiency of bearing 200. Lubricating fluid has an unimpeded, straight path from openings 214 of channel 212 through channel 212 to bearing 208. As a result, excessive amounts of lubricating fluid can flow into bearing 200, causing the churning losses noted above.

SUMMARY

According to aspects illustrated herein, there is provided a tandem ball bearing, including: an axis of rotation; an outer race; an inner race located radially inwardly of the outer race; a cage radially disposed between the inner and outer races and including a first surface, the first surface facing at least partially in a first axial direction, parallel to the axis of rotation, and bounding a portion of the cage extending furthest in the first axial direction; a first roller ball disposed in the cage and radially disposed between the inner and outer races; a second roller ball disposed in the cage radially outwardly of the first roller ball; and a channel bounded by the inner race and the cage and including an opening facing in the first axial direction and bounded by the inner race and the first surface of the cage. A first line, in a second axial direction, opposite the first axial direction, passes through in sequence: the cage; the channel; the inner race; and the first roller ball.

According to aspects illustrated herein, there is provided a tandem ball bearing, including: an axis of rotation; an outer race; an inner race located radially inwardly of the outer race and including a first surface, the first surface facing at least partially in a first axial direction, parallel to the axis of rotation and bounding a portion of the inner race extending furthest in the first axial direction; a cage radially disposed between the inner and outer races and including a second surface, the second surface facing at least partially in the first axial direction and bounding a portion of the cage extending furthest in the first axial direction; a first roller ball disposed in the cage and radially disposed between the inner and outer races; a second roller ball disposed in the cage radially outwardly of the first roller ball; and a channel bounded by the inner race and the cage and including an opening, the opening facing in the first axial direction and bounded, in a radial direction orthogonal to the axis of rotation, by the first and second surfaces. A first line, parallel to the axis of rotation, passes through in sequence: the cage; the channel; the inner race; and the first roller ball.

According to aspects illustrated herein, there is provided a tandem ball bearing, including: an axis of rotation; an outer race; an inner race located radially inwardly of the outer race and including a first surface, the first surface facing at least partially in a first axial direction, parallel to the axis of rotation and bounding a portion of the inner race extending furthest in the first axial direction; a cage radially disposed between the inner and outer races and including a second surface, the second surface facing at least partially in the first axial direction and bounding a portion of the cage extending furthest in the first axial direction; a first roller ball disposed in the cage and radially disposed between the inner and outer races; a second roller ball disposed in the cage radially outwardly of the first roller ball; and a channel bounded by the inner race and the cage and including an opening, the opening facing in the first axial direction and bounded, in a radial direction orthogonal to the axis of rotation, by the first and second surfaces. A first line, parallel to the axis of rotation, passes through in sequence: the cage; the channel; the inner race; and the first roller ball. A second line, orthogonal to the axis of rotation, passes through in sequence: the inner race, the channel, and the cage, without passing through the outer race.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 4:
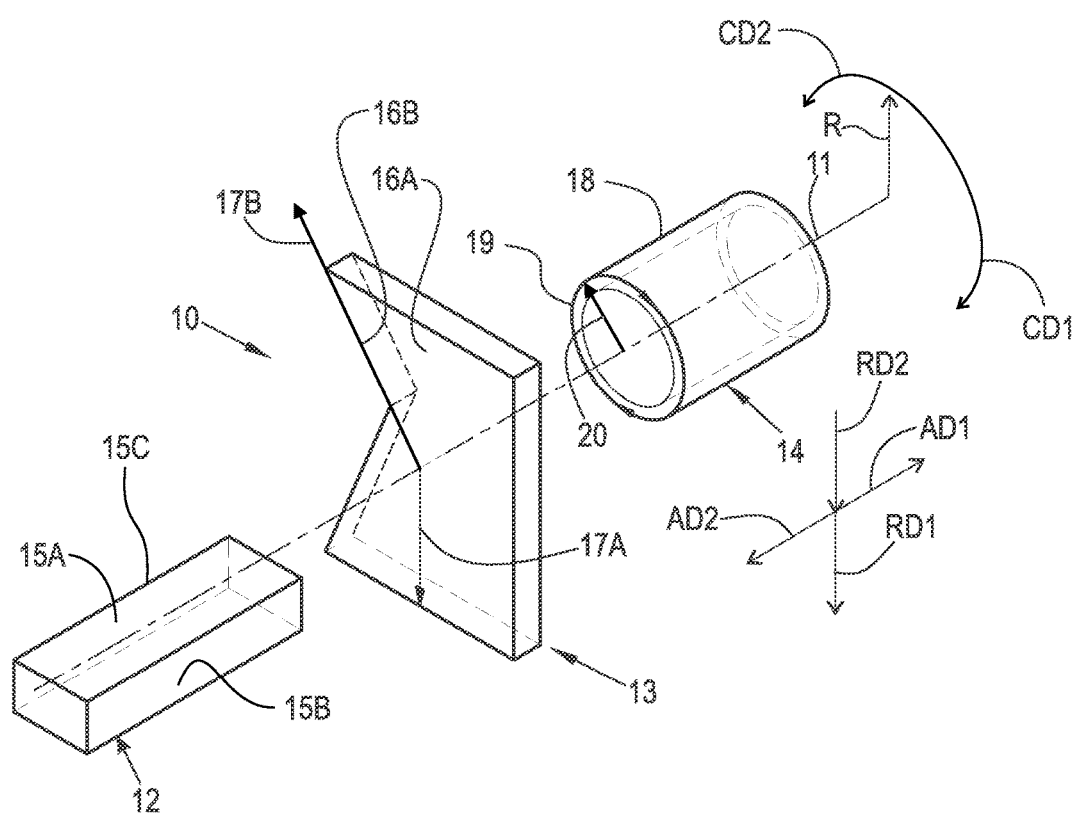
FIG. 4 is a perspective view of a cylindrical coordinate system demonstrating spatial terminology used in the present application; and, FIG. 5 is a partial cross-sectional view of a prior art tandem bearing.
Figure 5:
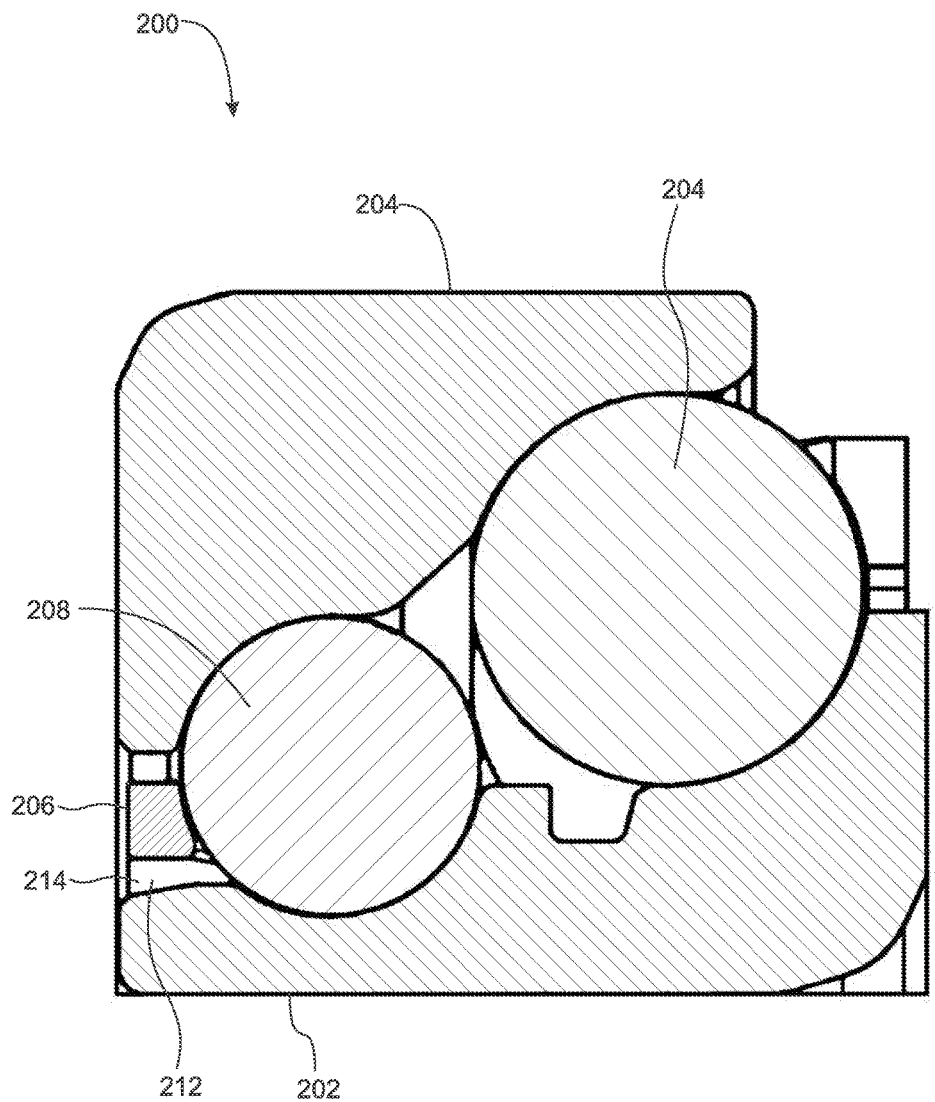

FIG. 4 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
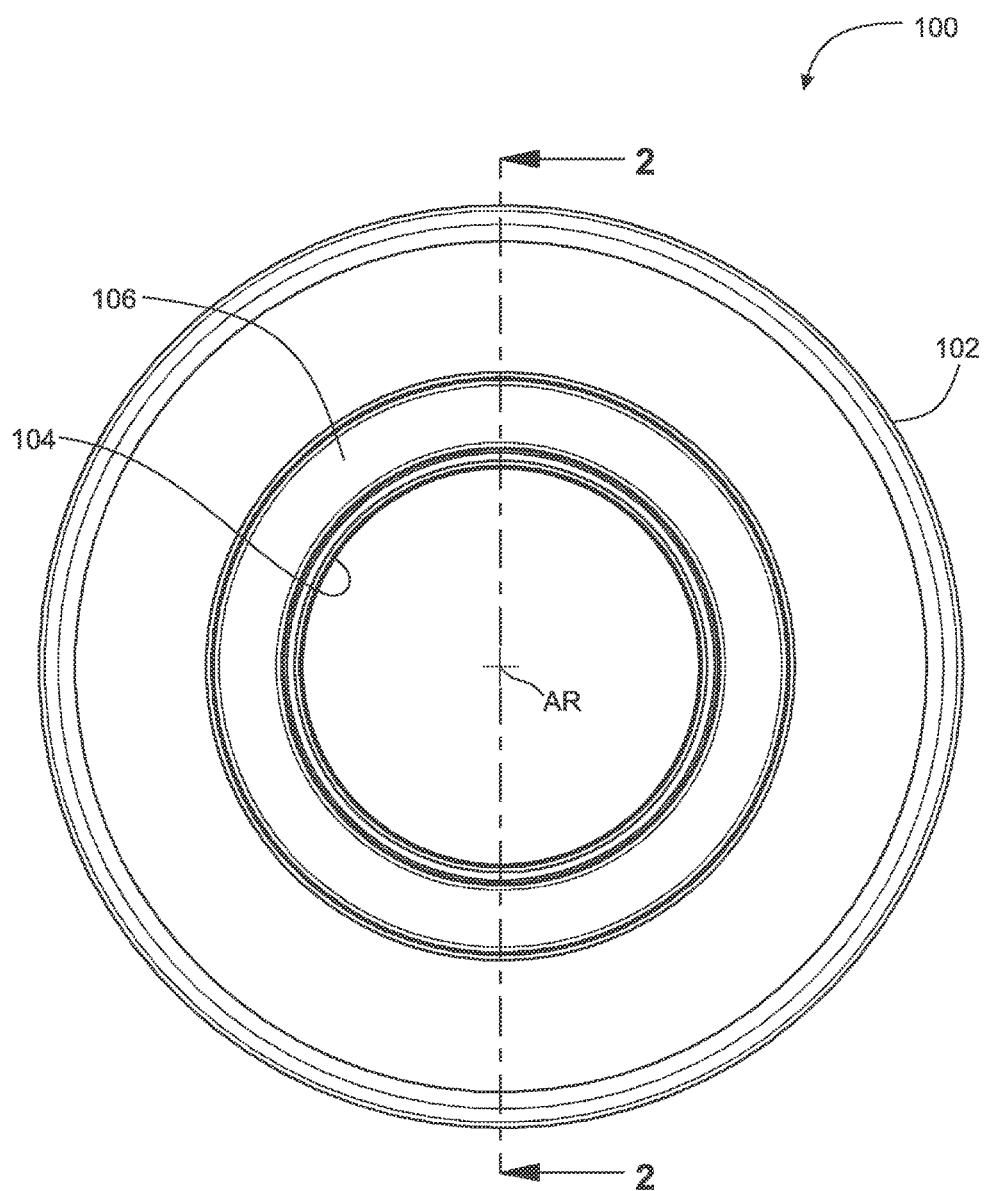
FIG. 1 is a front view of a tandem ball bearing with a labyrinth oil path.

FIG. 1 is a front view of tandem ball bearing 100 with a labyrinth oil path.

Figure 2:
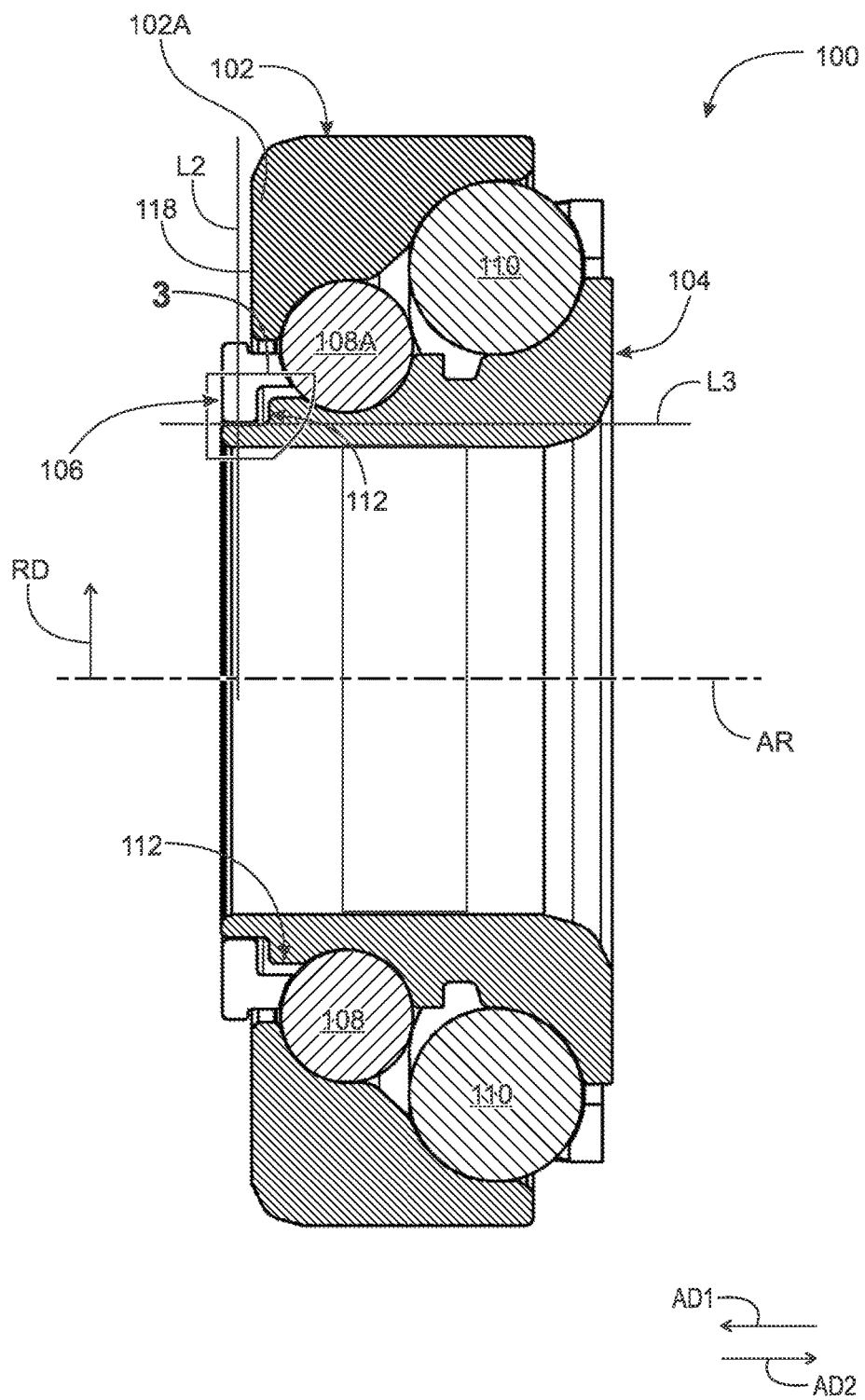
FIG. 2 is a cross-sectional view generally along line 2-2 in FIG. 1.

FIG. 2 is a cross-sectional view generally along line 2-2 in FIG. 1. The following should be viewed in light of FIGS. 1 and 2. Tandem ball bearing 100 includes: axis of rotation AR; outer race 102; inner race 104 located radially inwardly of outer race 102; cage 106; roller balls 108; roller balls 110; and channel 112, also referred to as labyrinth 112. Balls 108 and 110 are disposed in cage 106 and are radially disposed between races 102 and 104. Balls 108 are located radially inwardly of balls 110. Channel 112 is bounded by inner race 104 and cage 106.

Figure 3:
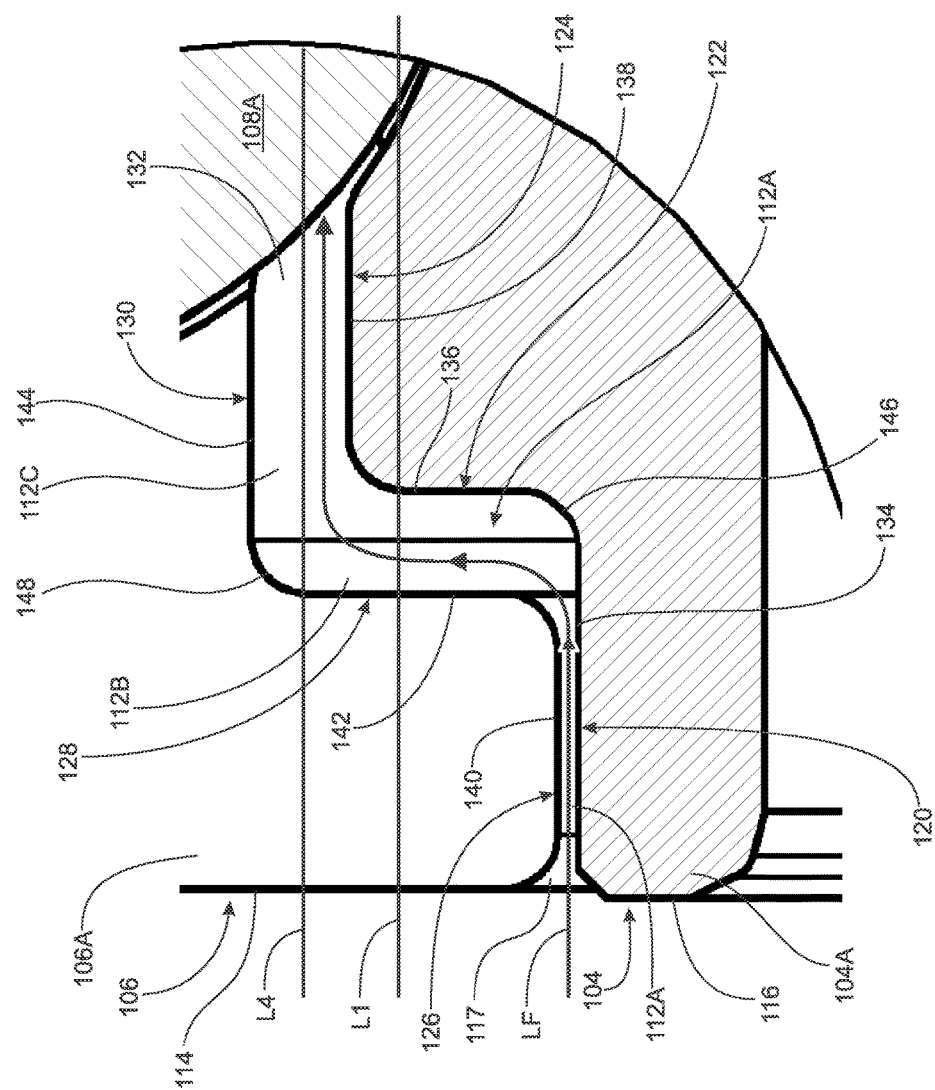
FIG. 3 is a detail of area 3 in FIG. 2.

FIG. 3 is a detail of area 3 in FIG. 2. The following should be viewed in light of FIGS. 1 through 3. Line L1, in axial direction AD1, parallel to axis of rotation AR, passes through in sequence: cage 106; portion 112A of channel 112; race 102, and ball 108A. In the discussion above and that follows, capital letters are used to designate a specific component from a group of components otherwise designated by a three digit number, for example, ball 108A is a specific example of balls 108. Line L2, orthogonal to axis AR, passes through in sequence: race 104; channel 112; and cage 106, without passing through race 102.

Cage 106 includes surface 114 and race 104 includes surface 116. Each of surfaces 114 and 116 faces at last partially in axial direction AD1. By "faces at last partially in direction AD1," we mean that the surface is orthogonal to axis of rotation AR or that a vector orthogonal to the surface includes a scalar component parallel to the axis of rotation. For example, the surface is not orthogonal to the axis of rotation. Surfaces 114 and 116 bound portions 106A and 104A, of cage 106 and race 104, respectively, extending furthest in axial direction AD1. Portion 112A includes opening 117 bounded by surfaces 114 and 116. Race 102 includes surface 118 facing at least partially in axial direction AD1 and bounding portion 102A, of race 102, extending furthest in axial direction AD1. Surfaces 114 and 116 are located further in direction AD1 than surface 118. In an example embodiment, no portion of channel 112 is bounded by race 102. For example, cage 106 separates race 102 from channel 112.

Inner race 102 includes surfaces 120, 122, and 124. Cage 106 includes surfaces 126, 128, and 130. Channel 112 is includes portions 112B and 112C. Portion 112A is bounded radially inwardly and radially outwardly by surfaces 120 and 126, respectively. Portion 112A includes opening 117. Portion 112B: is continuous with portion 112A; and is bounded in opposite axial directions AD1 and AD2 by surfaces 128 and 122, respectively. Portion 112C: is continuous with portion 112B; and is bounded radially inwardly and radially outwardly by surfaces 124 and 130, respectively. Portion 112C includes opening 132 facing direction AD2.

At least a part of portion 112C is radially outward of portion 112B. At least a part of portion 112B is radially outward of portion 112A. Portion 112C is radially outward of portion 112A. Line L3, parallel to axis of rotation AR, passes through portion 112A and inner race 104 without passing through portion 112C. Line L4, parallel to axis of rotation AR, passes through, in sequence, cage 106, portion 112C, and roller ball 108A, without passing portion 112A. In an example embodiment, line L3 does not pass through roller ball 108. Line L1 passes through portion 112B without passing through portion 112A or portion 112C. Portion 112C is off-set, in axial direction AD2, from portion 112A.

Surfaces 120, 122, and 124 include segments 134, 136 and 138, respectively. Surfaces 126, 128, and 130 includes segments 140, 142 and 154, respectively. In an example embodiment: segments 134, 138, 140 and 144 are parallel to axis AR; and segments 136 and 142 are perpendicular to axis AR. In an example embodiment: one, some or all of segments 134, 138, 140 and 144 are not parallel to axis AR. For example: segment 134 and/or segment 140 is not orthogonal to line L2 and line L2 forms a respective acute angle with segment 134 and/or with segment 140. For example, segment 142 is not orthogonal to line L1 and segment 142 forms an acute angle with line L1. For example, segment 112A can radially expand along direction AD1 and segment 112B can expand axially along a radially outward direction.

During operation of bearing 100, that is when races 102 and 104 are rotating with respect to each other, lubricating fluid, or oil, LF is arranged to: flow into openings 117; flow through channel 112; and exit openings 132 (be expelled from openings 132) to contact balls 108.

The following should be viewed in light of FIGS. 1 through 3. The following describes a method for using tandem ball bearing 100 with a labyrinth oil path, or channel 112. Although the method is presented as a sequence of steps for clarity, no order should be inferred from the sequence unless explicitly stated. A first step rotates inner and outer races 102 and 104, with respect to each other. A second step flows lubricating fluid LF through segment 112A, bounded by race 104 and cage 106, in which roller ball 108A is disposed. A third step passes fluid LF through line L1. Line L1 passes through in sequence: cage 106; segment 112B; and inner race 104.

The following should be viewed in light of FIGS. 1 through 3. The following describes a method for using tandem ball bearing 100 with a labyrinth oil path, or channel 112. Although the method is presented as a sequence of steps for clarity, no order should be inferred from the sequence unless explicitly stated. A first step rotates outer race 102 and inner race 104, with respect to each other. A second step flows lubricating fluid LF in the following sequence: through opening 117; through portion 112A; into portion 112B; and past line L1. A third step contacts ball 108A with fluid LF. A fourth step flows fluid LF past line L2 without fluid LF contacting race 102.

The following should be viewed in light of FIGS. 1 through 3. The following describes a method for using tandem ball bearing 100 with a labyrinth oil path, or channel 112. Although the method is presented as a sequence of steps for clarity, no order should be inferred from the sequence unless explicitly stated. A first step rotates outer race 102 and inner race 104, with respect to each other. A second step flows lubricating fluid LF: though opening 117; through portion 112B; and past line L1. A third step contacts ball 108A with fluid LF. A fourth step flows fluid LF past line L2 without fluid LF contacting race 102. A fifth step flows fluid LF through opening 132. In an example embodiment, a sixth step flows fluid LF through portion 112C bounded by surfaces 138 and 144.

The following should be viewed in light of FIGS. 1 through 3. The following describes a method for using tandem ball bearing 100 with a labyrinth oil path, or channel 112. Although the method is presented as a sequence of steps for clarity, no order should be inferred from the sequence unless explicitly stated. A first step rotates outer race 102 and inner race 104, with respect to each other. A second step flows lubricating fluid LF: though opening 117 and between surfaces 114 and 116; through portion 112A with distance 146; and past line L1. A third step flows fluid LF through portion 112C. A fourth step contacts ball 108A with fluid LF. A fifth step flows fluid LF past line L2 without fluid LF contacting race 102.

Bearing 100 eliminates or dramatically reduces the churning losses noted above, by restricting the flow of fluid LF through channel 112 as follows:

1. Instead of an unimpeded straight path for lubricant flow, as is the case for known tandem roller bearings, such as bearing 200 with channel 212, bearing 100 includes channel 112 with three distinct portions 112A, 112B and 112C, angled with respect to each other. The three portions force fluid LF to change directions when flowing through channel 112 and extend a length of a flow path for fluid LF. For example, bends 146 and 148, connecting portions 112A and 112B and connecting portions 112B and 112C, respectively, force fluid LF to change direction, reducing the flow rate for fluid LF. As a result, the rate of fluid LF flow to rollers 108 and 110 is substantially reduced.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
100 tandem ball bearing
102 outer race
102A portion of race 102
104 inner race
104A portion of race 104
106 cage
106A portion of cage 106
108 roller ball
110 roller ball
112 channel
112A portion of channel 112
112B portion of channel 112
112C portion of channel 112
114 surface of cage 106
116 surface of race 104
117 opening
118 surface of race 102
120 surface of race 102
122 surface of race 102
124 surface of race 102
126 surface of cage 106
128 surface of cage 106
130 surface of cage 106
132 opening
134 segment of surface 120
136 segment of surface 122
138 segment of surface 124
140 segment of surface 126
142 segment of surface 128
144 segment of surface 130
146 bend in channel 112
148 bend in channel 112
200 prior art bearing
202 inner race
204 outer race
206 cage
208 roller ball
210 roller ball
212 channel
214 opening

The invention claimed is:

1. A tandem ball bearing, comprising:
an axis of rotation;
an outer race;
an inner race located radially inwardly of the outer race;
a cage radially disposed between the inner and outer races and including a first surface, the first surface:
facing at least partially in a first axial direction, parallel to the axis of rotation; and, bounding a portion of the cage in the first axial direction;
a first roller ball disposed in the cage and radially disposed between the inner and outer races;
a second roller ball disposed in the cage radially outwardly of the first roller ball; and,
a channel:
  bounded by the inner race and the cage; and,
  including an opening facing in the first axial direction and bounded by the inner race and the first surface of the cage, wherein a first line, parallel to the axis of rotation, passes through in sequence: the cage; the channel; the inner race; and the first roller ball.

2. The tandem ball bearing of claim 1, wherein a second line, orthogonal to the axis of rotation, passes through in sequence: the inner race, the channel, and the cage, without passing through the outer race.

3. The tandem ball bearing of claim 1, wherein:
the outer race includes a second surface:
  facing at least partially in the first axial direction; and,
  bounding a portion of the outer race in the first axial direction; and,
the first surface is located further in the first axial direction than the second surface.

4. The tandem ball bearing of claim 3, wherein:
the inner race includes a third surface:
  facing at least partially in the first axial direction; and,
  bounding a portion of the inner race in the first axial direction; and,
the third surface is located further in the first axial direction than the second surface.

5. The tandem ball bearing of claim 1, wherein no portion of the channel is bounded by the outer race.

6. The tandem ball bearing of claim 1, wherein the channel includes:
a first portion including the opening; and,
a second portion:
  bounded radially outwardly and radially inwardly by the cage and the inner race, respectively; and,
  located radially outwardly of the opening.

7. A method of using the tandem ball bearing of claim 1, comprising:
rotating the inner and outer races with respect to each other; and,
flowing lubricating fluid through the opening and the channel to the first roller ball.

8. A tandem ball bearing, comprising:
an axis of rotation;
an outer race;
an inner race located radially inwardly of the outer race and including a first surface, the first surface:
  facing at least partially in a first axial direction, parallel to the axis of rotation; and,
  bounding a portion of the inner race in the first axial direction;
a cage radially disposed between the inner and outer races and including a second surface, the second surface:
  facing at least partially in the first axial direction; and,
  bounding a portion of the cage in the first axial direction;
a first roller ball disposed in the cage and radially disposed between the inner and outer races;
a second roller ball disposed in the cage radially outwardly of the first roller ball; and,
a channel bounded by the inner race and the cage and including an opening, the opening:
  facing in the first axial direction; and,
  bounded radially inwardly and outwardly by the first and second surfaces, respectively, wherein a first line, parallel to the axis of rotation, passes through in sequence: the cage; the channel; the inner race; and the first roller ball.

9. The tandem ball bearing of claim 8, wherein a second line, orthogonal to the axis of rotation, passes through in sequence: the inner race, the channel, and the cage without passing through the outer race.

10. The tandem ball bearing of claim 8, wherein no portion of the channel is bounded by the outer race.

11. The tandem ball bearing of claim 8, wherein
the outer race includes a third surface, the third surface:
  facing at least partially in the first axial direction; and,
  bounding a portion of the outer race in the first axial direction;
and,
the first and second surfaces are each located further in the first axial direction than the third surface.

12. The tandem ball bearing of claim 8, wherein the channel includes:
a first portion including the opening; and,
a second portion:
  bounded radially outwardly and radially inwardly by the cage and the inner race, respectively; and,
  located radially outwardly of the opening.

13. A method of using the tandem ball bearing of claim 8, comprising:
rotating the inner and outer races with respect to each other;
flowing lubricating fluid through the opening;
flowing the lubricating fluid through the channel and past the first line; and,
contacting the first roller ball with the lubricating fluid.

14. A tandem ball bearing, comprising:
an axis of rotation;
an outer race;
an inner race located radially inwardly of the outer race and including a first surface, the first surface:
  facing at least partially in a first axial direction, parallel to the axis of rotation; and,
  bounding a portion of the inner race in the first axial direction;
a cage radially disposed between the inner and outer races and including a second surface, the second surface:
  facing at least partially in the first axial direction; and,
  bounding a portion of the cage in the first axial direction;
a first roller ball disposed in the cage and radially disposed between the inner and outer races;
a second roller ball disposed in the cage radially outwardly of the first roller ball; and,
a channel bounded by the inner race and the cage and including an opening, the opening:
  facing in the first axial direction; and,
  bounded radially inwardly and outwardly by the first and second surfaces, respectively, wherein:
a first line, parallel to the axis of rotation, passes through in sequence: the cage; the channel; the inner race; and the first roller ball; and,
a second line, orthogonal to the axis of rotation, passes through in sequence: the inner race, the channel, and the cage, without passing through the outer race.

15. The tandem ball bearing of claim 14, wherein no portion of the channel is bounded by the outer race.

16. The tandem ball bearing of claim 14, wherein
the outer race includes a third surface, the third surface:
   facing at least partially in the first axial direction; and,
   bounding a portion of the outer race in the first axial direction; and,
the first and second surfaces are each located further in the first axial direction than the third surface.

17. The tandem ball bearing of claim 14, wherein:
the cage includes a third surface; and,
the channel includes:
   a first portion including the opening; and,
   a second portion:
      bounded radially outwardly and radially inwardly by the third surface and the inner race, respectively; and,
      located radially outwardly of the first portion.

18. A method of using the tandem ball bearing of claim 17, comprising:
rotating the inner and outer races with respect to each other;
flowing lubricating fluid through the opening;
flowing, in sequence, the lubricating fluid:
   through the first portion of the channel;
   past the second line;
   past the first line; and,
   through the second portion; and,
contacting the first roller ball with the lubricating fluid.

19. The method of claim 18, further comprising:
flowing the lubricant radially outwardly from the first portion to the second portion.

20. A method of using the tandem ball bearing of claim 14, comprising:
rotating the inner and outer races with respect to each other;
flowing lubricating fluid through the opening;
flowing the lubricating fluid, in sequence:
   past the second line; and,
   past the first line; and,
contacting the first roller ball with the lubricating fluid.

\* \* \* \* \*